| United States Patent [19] | [11] 3,915,803 |
| --- | --- |
| Kominek | [45] Oct. 28, 1975 |

[54] PROCESS FOR PRODUCING CYCLOHEXIMIDE

[75] Inventor: Leo A. Kominek, Portage, Mich.

[73] Assignee: The Upjohn Company, Kalamazoo, Mich.

[22] Filed: Aug. 19, 1974

[21] Appl. No.: 498,311

[52] U.S. Cl. .............................. 195/80 R; 195/80 R
[51] Int. Cl.² ........................................... C12D 9/00
[58] Field of Search ................................. 195/80 R

[56] References Cited
OTHER PUBLICATIONS
Chem. Abstracts, Vol. 64, 8664h; 1966.

*Primary Examiner*—Lionel M. Shapiro
*Assistant Examiner*—Robert J. Warden
*Attorney, Agent, or Firm*—Roman Saliwanchik

[57] ABSTRACT

It has been found that cycloheximide production by a culture of *Streptomyces griseus* is maintained and total yields of the antibiotic are increased when a glucose feed is begun at about 48 hrs. and continued until the culture becomes senescent at about 8 to 10 days.

9 Claims, 2 Drawing Figures

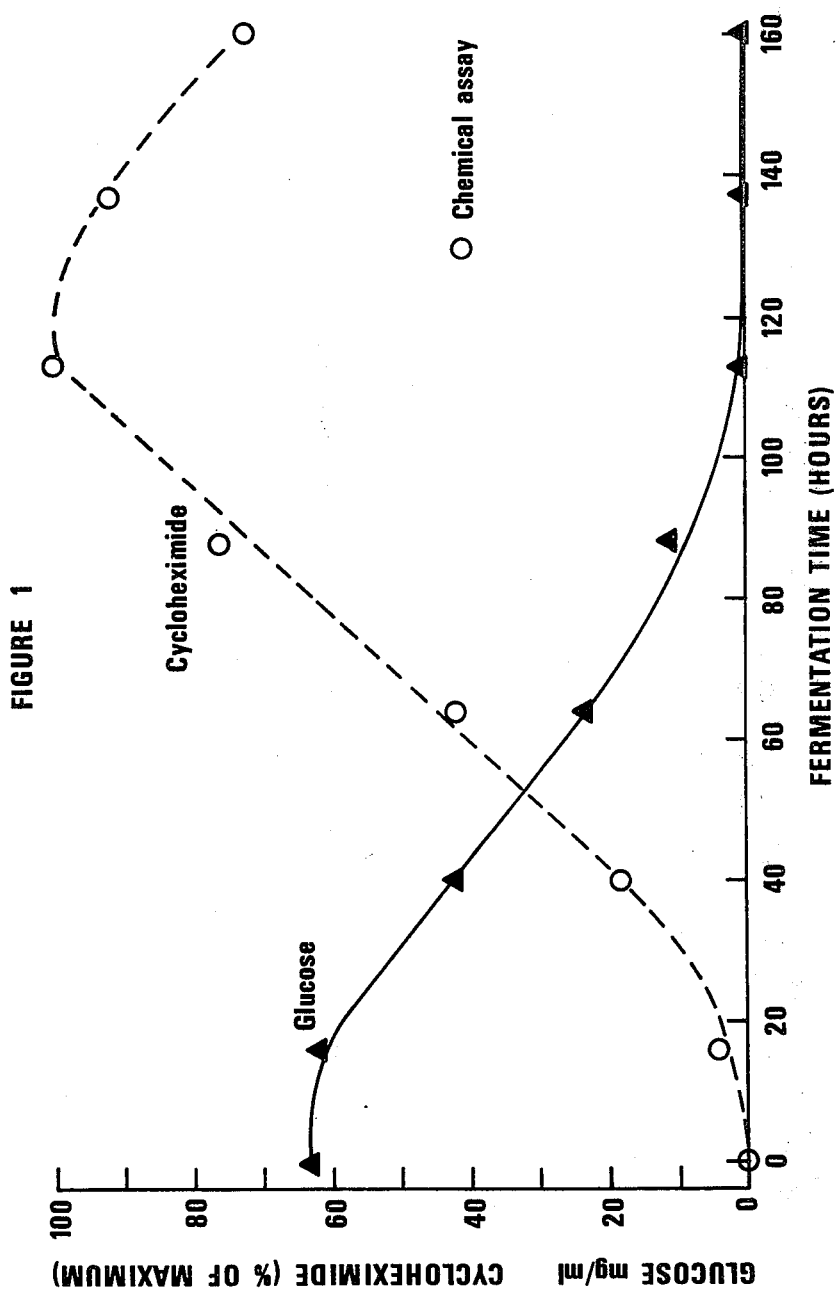

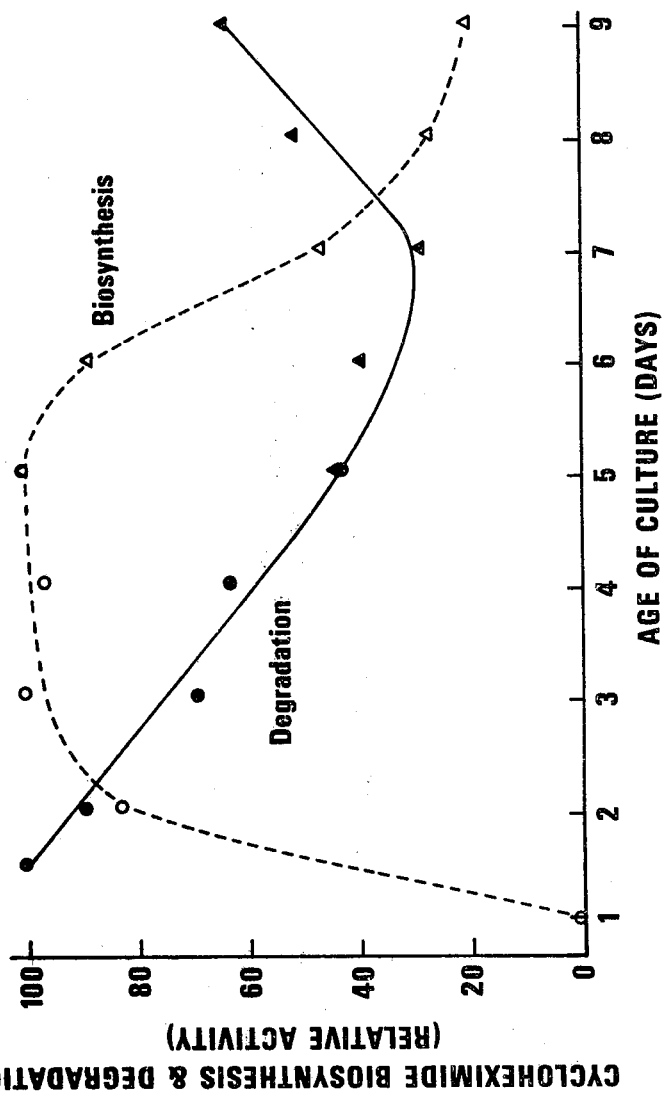

PROCESS FOR PRODUCING CYCLOHEXIMIDE

INTRODUCTION AND SUMMARY OF THE INVENTION

This invention pertains to a fermentation process for producing cycloheximide. The invention is more particularly directed to an improved fermentation process for producing cycloheximide whereby the yields of cycloheximide are increased. Still more particularly, the invention is directed to the process of increasing yields of cycloheximide by continuous infusion of glucose into the fermentation medium.

Cycloheximide is an antibiotic produced by fermentation culture of Streptomyces griseus, Streptomyces noursei, Streptomyces albulus (ATCC 12757), Streptomyces naraensis, or other cycloheximide-producing microorganism. It was first discovered by A. Whiffen et al. in 1946. She observed the activity of the compound against the yeasts and it became known as the first antifungal antibiotic. The early structural identification of the compound was accomplished by Kornfeld et al. who reported their observations and data in J. Am. Chem. Soc. 71, pp. 150–159 (1949). Cycloheximide has the emmpirical formula $C_{15}H_{23}NO_4$ and is structurally identified as 3-[2-(3,5-dimethyl-2-oxocyclohexyl)-2-hydroxyethyl]glutarimide. The absolute configuration of the molecule is as follows:

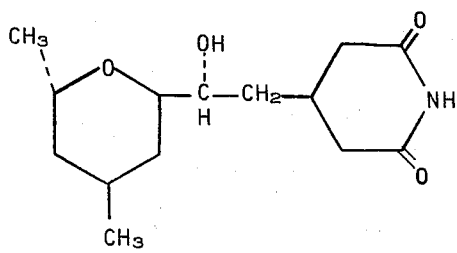

Very soon thereafter some practical utilities for cycloheximide as a plant disease fungicide were demonstrated, and commercial development followed. Subsequently, cycloheximide has been marketed as a plant fungicide for many years and this use continues mainly against fungal diseases of turf and for powdery mildew on roses. It has been used against cherry leaf spot, white pine blister rust, and other fungal diseases of plants. The biochemical is the more remarkable because it is the most powerful rodent repellent known (particularly rats). More recently, cycloheximide has been recognized and is being developed as an abscission agent for citrus fruits and olives.

DETAILED DESCRIPTION OF THE INVENTION

A fermentation medium suitable for cycloheximide production with S. griseus is one consisting of

| | |
|---|---|
| Glucose monohydrate (Clintose or Cerelose) | 60 g./l. |
| Yeast | 2.5 g./l. |
| $(NH_4)_2SO_4$ | 5 g./l. |
| $CaCO_3$ | 8 g./l. |
| NaCl | 4 g./l. |
| $KH_2PO_4$ | 0.2 g./l. |
| Soybean meal, defatted (Kaysoy 200C) | 14.0 g./l. |
| Tap water | to one l. |

When a cycloheximide-producing strain of S. griseus is innoculated in a medium such as the foregoing one and conditions of temperature, stirring, and aeration are maintained optimally, the microorganism propagates very rapidly. During the initial 24hrs. of growth not much glucose is utilized; but later, utilization of glucose proceeds rapidly and production of cycloheximide increases commensurately (see FIG. 1).

The data seem to show that glucose utilization is related to cycloheximide production. It is seen that as the concentration of glucose is diminished to substantially zero values at about 120 hrs. (5 days), the concentration of cycloheximide reaches a peak and then begins to decline. It appears that degradative side reactions continue to destroy already produced cycloheximide once the original supply of glucose is used up.

In consideration of these observations, some tests were initiated to determine what modifications of the fermentation culture could be made in order to utilize the cultures possible potential for continued production of cycloheximide and to minimize the degradative processes that seem to be going on.

According to this invention, it has been found that a continuous infusion of glucose will maintain the cycloheximide synthesizing power of the culture and also retard the degradative reaction. Thus, cultures of cycloheximide-producing microorganisms, particularly S. griseus, can be made more productive in accordance with the process of the invention by the continuous infusion of glucose.

The optimal level of glucose feed was determined by infusing glucose at varying rates into standardized fermentation cultures. In accordance with the data and observations, it was found that 0.24 g./hr./l. is a reasonably adequate rate of feed when the culture is initiated and developed as described. Various levels of glucose feed can be used either higher or lower than 0.24 g./hr./l., but maintaining glucose level in the culture medium of about 20 g./l. seems to afford reasonably efficient cycloheximide production.

Since one does not expect fermentation cultures to continue to produce antibiotics for extended periods, it was appropriate to determine when senescence became the limiting factor in a fermentation culture-producing cycloheximide. Accordingly, cultures of S. griseus were studied for rate of cycloheximide degradation as well as rates of cycloheximide production. The data presented in FIG. 2 were obtained. These data show that a minimal rate of degradation occurs at about 7 days after which time cycloheximide degradation increases rapidly. The data for rate of production confirm those of FIG. 1 for the second day after which production proceeds at a high rate until after the sixth day when it declines precipitously. Both the increase in degradative ability and the decrease in biosynthetic potential coincide with the exhaustion of glucose from the fermentation medium.

Thus in accordance with the observations, one could expect that a continuous glucose feed initiated at 48 hours might well be continued for from 4 to 8 days in order to obtain maximum production of cycloheximide.

Hence, according to a preferred embodiment of the invention, a glucose feed at the rate of 60 g./hr./250 l. or 0.24 g./hr./l. of culture is initiated at about the 48th hour and continued for 4 to 8 days for maximum production of cycloheximide.

The enhanced production of cycloheximide obtained according to the process of this invention is demonstrated by the following representative test: The variables of time, rate of feed, and other conditions of fermentation are fixed in the test in order to provide reference points for those of ordinary skill in the art. It will be recognized that there can be variations of time, rate of feed, and other conditions of fermentation without departing from the contemplated scope of this invention.

EXAMPLE 1

Two fermentor vessels (A and B)), each containing 250 liters of the fermentation medium described previously, were inoculated with 12.5 l. of a seed culture of *Streptomyces griseus*. The culture in each vessel was maintained at 25° C., agitated at 300 rpm, and aerated at the rate of 250 slm. A glucose feed was initiated in fermentor A at 48 hours at the rate of 60 g./hr./250 l. Fermentor B did not receive a glucose feed. Periodic chemical assay of the whole beers showed that the maximum cycloheximide content was reached in fermentor A at 237 hours (9.9 days) and in fermentor B at 140 hours (5.8 days). Comparison of the maximal titers achieved showed that fermentor A (with glucose feed) produced 43 percent more cycloheximide than fermentor B (without glucose feed). Extraction of these fermentations with methylene chloride showed a 52 percent increase in extracted yield for fermentor A.

Similar results have been obtained with fermentor tests conducted in the same manner when the glucose feed was at the rate of 50 g./hr., 55 g./hr., 65 g./hr and 70 g./hr. per 250 liter fermentation.

Bioassay — This is the usual paper disc-agar plate assay method using *S. cereviseae* as test organism.

Chemical Assay — This is a colorimetric assay developed by Takeshita et al. [Takeshita, M.; H, Takehashi, and T. Ikuda, Chem. and Pharm. Bull. 10, 304–308, Studies on the Streptomyces Antibiotic, Cycloheximide XIII New Spectrophotometric Determination of Cycloheximide (1962)] and is based on the reaction of cycloheximide with resorcinol. Related compounds such as isocycloheximide and anhydrocycloheximide give full response in this assay but neither compound is present in significant amounts in the fermentation beers. Bioassay and Chemical assay compare quite favorably. The chemical procedure requires extraction of the whole beer by methylene chloride prior to assay.

I claim:

1. The process of improving the yield of cycloheximide from a cycloheximide-producing strain of Streptomyces in a fermentation culture which comprises providing a continuous infusion of glucose feed after an initial period of growth and propagation.

2. The process according to claim 1 wherein in a glucose solution is infused at the rate of from 0.20 to 0.28 g. glucose/hr./l.

3. The process according to claim 2 wherein glucose is infused at the rate of 0.24 g. glucose/hr./l.

4. The process according to claim 1 wherein the cycloheximide-producing strain of microorganism is *Streptomyces griseus*.

5. In a process for producing cycloheximide by fermentation culture of a cycloheximide-producing strain of Streptomyces, the improvement which comprises providing a continuous infusion of glucose for cycloheximide biosynthesis at the initial supply of glucose in the fermentation medium becomes depleted.

6. The process according to claim 5 wherein a strain of *Streptomyces griseus* is cultured.

7. The process according to claim 6 wherein a glucose feed is provided after the culture has been maintained under optimal conditions for growth and propagation for 48 hours.

8. The process according to claim 7 wherein the glucose feed is by continuous infusion at the rate of 0.20 to 0.28 g. glucose/hr./l.

9. The process according to claim 8 wherein the glucose feed is a solution infused at the rate of 0.24 g. glucose/hr./l.

* * * * *

UNITED STATES PATENT AND TRADEMARK OFFICE
CERTIFICATE OF CORRECTION

PATENT NO. : 3,915,803
DATED : October 28, 1975
INVENTOR(S) : Leo A. Kominek

It is certified that error appears in the above--identified patent and that said Letters Patent are hereby corrected as shown below:

Column 1, line 24, for "emmpirical" read -- empirical --;

line 67, for "innoculated" read -- inoculated --.
Column 4, line 25, claim 5, for "at" read -- as --.

Signed and Sealed this first Day of June 1976

[SEAL]

Attest:

RUTH C. MASON
*Attesting Officer*

C. MARSHALL DANN
*Commissioner of Patents and Trademarks*